United States Patent Office 3,374,238
Patented Mar. 19, 1968

3,374,238
3-HYDROXYQUINOPHTHALONE DIAMIDO PIGMENTS
Arnold Wick, Therwil, and Christoph Frey, Basel, Switzerland, assignors to Ciba Limited, Basel, Switzerland, a Swiss company
No Drawing. Filed June 18, 1965, Ser. No. 465,157
Claims priority, application Switzerland, June 26, 1964, 8,416/64
8 Claims. (Cl. 260—287)

ABSTRACT OF THE DISCLOSURE

Pigments of the 3-hydroxyquinophthalone series of the formula (1)
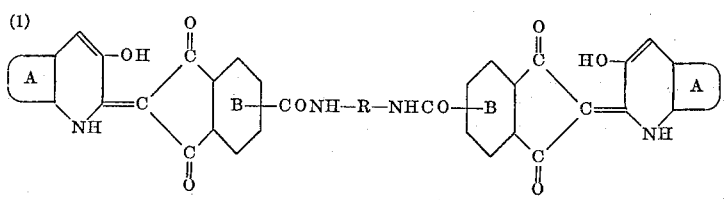

in which A represents an arylene residue, especially a benzene or naphthalene residue, R represents a direct bond or an organic residue and in which the benzene residue B may contain further substituents, for example, halogen atoms or alkoxy groups.

---

The present invention provides valuable new pigments of the 3-hydroxyquinophthalone series of the formula (1)
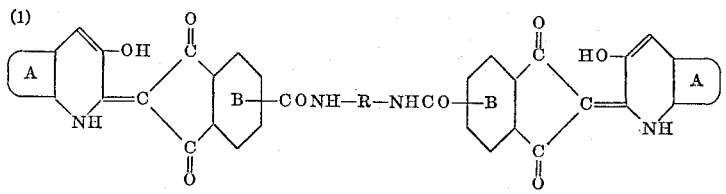

in which A represents an arylene residue, especially a benzene or naphthalene residue, R represents a direct bond or an organic residue and in which the benzene residue B may contain further substituents, for example, halogen atoms or alkoxy groups.

Since the products of the invention are pigments they naturally must not contain groups imparting solubility in water, particularly acid groups imparting solubility in water, for example, sulphonic acid groups and carboxylic acid groups.

The new pigments may be obtained by condensing a diamine with a monocarboxylic acid halide of the formula (2)
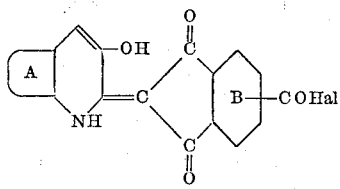

in which A and B have the meanings given above in a molar ratio of 1:2.

The monocarboxylic acid halides used are preferably acid chlorides of the carboxylic acids of the formulae (3)

(4)

in which X and Y represent hydrogen or halogen atoms or alkyl groups, or X and Y together with two adjacent carbon atoms may form the residue of a benzene ring.

The carboxylic acids of the Formulae 3 and 4 are obtainable by condensing trimellitic anhydride or hemimellitic anhydride with a 2-methyl-3-hydroxyquinoline-4-carboxylic acid, for example, with 2-methyl-3-hydroxyquinoline-4-carboxylic acid,
2-methyl-3-hydroxy-5-chloroquinoline-4-carboxylic acid,
2-methyl-3-hydroxy-6-chloroquinoline-4-carboxylic acid,
2-methyl-3-hydroxy-6-bromoquinoline-4-carboxylic acid,
2-methyl-3-hydroxy-6-nitroquinoline-4-carboxylic acid,
2-methyl-3-hydroxy-6-methoxyquinoline-4-carboxylic acid,
2-methyl-3-hydroxy-6-methylquinoline-4-carboxylic acid,
2-methyl-3-hydroxy-6-acetylaminoquinoline-4-carboxylic acid,
2-methyl-3-hydroxy-6:7-dichloroquinoline-4-carboxylic acid,
2-methyl-3-hydroxy-6:8-dichloroquinoline-4-carboxylic acid,
2-methyl-3-hydroxy-6:8-dibromoquinoline-4-carboxylic acid,
2-methyl-3-hydroxy-5:6:8-trichloroquinoline-4-carboxylic acid,
2-methyl-3-hydroxy-6-chloro-8-methylquinoline-4-carboxylic acid,
2-methyl-3-hydroxy-7-chloro-8-methylquinoline4-carboxylic acid,
2-methyl-3-hydroxy-6-chloro-5:8-dimethylquinoline-4-carboxylic acid, 2-methyl-3-hydroxy-5-methyl-8-methoxyquinoline-4-carboxylic acid,
2-methyl-3-hydroxy-6-chloro-7-bromo-8-methoxyquinoline-4-carboxylic acid,
2-methyl-3-hydroxy-5-methyl-6-chloro-8-methoxyquinoline-4-carboxylic acid,
2-methyl-3-hydroxy-5:6-benzoquinoline-4-carboxylic acid,
2-methyl-3-hydroxy-6:7-benzoquinoline-4-carboxylic acid and
2-methyl-3-hydroxy-7:8-benzoquinoline-4-carboxylic acid.

Conversion of the carboxylic acids into their acid halides can be carried out in the usual manner by treatment with acid halogenating agents, especially thionyl chloride. Treatment with the acid halogenating agents is advantageously carried out in an inert organic solvent, for example, dimethylformamide, a chlorobenzene, for example, monochlorobenzene or dichlorobenzene, toluene, xylene or nitrobenzene. Dimethylformamide may also be added when working with any of the five last-mentioned solvents.

The diamines to be used in accordance with the invention are, for example, hydrazine or aliphatic diamines, for example, ethylenediamine, heterocyclic diamines, but preferably aromatic diamines, especially those of the benzene, diphenyl and naphthalene series. Diamines that have been found to be specially suitable are those of the formulae (5)
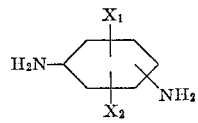

or (6)
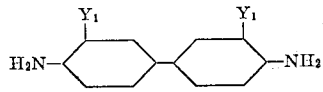

in which $X_1$ and $X_2$ represent hydrogen or halogen atoms, alkyl, alkoxy, carbalkoxy, carbamide or nitro groups and $Y_1$ represents hydrogen or halogen atoms, alkyl or alkoxy groups. The following diamines may be mentioned as examples:

1:2-diaminobenzene,
1:2-diamino-4-nitrobenzene,
1:3-diaminobenzene,
1:3-diamino-2-methylbenzene,
1:3-diamino-4-methylbenzene,
1:3-diamino-4-chlorobenzene,
1:3-diamino-2:6-dimethylbenzene,
1:3-diamino-4:6-dimethylbenzene,
1:3-diamino-2:5-dichlorobenzene,
1:3-diamino-4:6-dichlorobenzene,
1:3-diamino-4:5:6-trichlorobenzene,
1:3-diamino-5-carbomethoxybenzene,
1:3-diamino-5-carbanilidobenzene,
1:4-diaminobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:4-diamino-2-chloro-5-methylbenzene,
1:4-diamino-2-chloro-5-methoxybenzene,
1:4-diamino-2-methyl-5-methoxybenzene,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
2:2':5:5'-tetrachloro-4:4'-diaminodiphenyl,
3:3'-dichloro-5:5'-dimethyl-4:4'-diaminodiphenyl,
4:4'-diaminodiphenylether,
4:4'-diaminodiphenylketone,
4:4'-diaminodiphenylsulphone,
3:3'-diaminodiphenylsulphone,
4:4-diaminodiphenylmethane,
3:3'-diaminodiphenylmethane,
3:3'-diamino-4:4'-dimethyldiphenylmethane,
3:3'-diamino-4:4'-dichlorobenzil,
4:4'-diamino-2:5:2':5'-tetrachlorodiphenylurea,
di-(4-aminobenzenesulphonyl)-methylimide,
4-(4'-aminobenzoylamino)-aminobenzene,
4:4'-diaminodiphenylformylamine,
4-aminobenzoic acid-4'-aminophenylester,
2:8-diaminochrysene,
3:8-diaminopyrene,
3:10-diaminopyrene,
4:11-diaminofluoroanthene,
2:6- or 1:5-diaminonaphthalene,
2:6-, 1:4- or 1:5-diaminoanthraquinone,
diaminobenzthiazoles, for example 2-(4'-aminophenyl)-6-aminobenzthiazole,
2:6-diaminopyridine,
2:6-diaminopyrimidine,
3:5-diamino-1-methyl-2:4:6-triazine, and
3:3'-diaminodibenzofuran.

Condensation between the carboxylic acid halides of the kind defined above and the diamines is advantageously carried out in an anhydrous medium. Under these conditions it proceeds surprisingly easily, even at temperatures within the boiling range of the common organic solvents for example toluene, monochlorobenzene, dichlorobenzene, trichlorobenzene, nitrobenzene and the like. To accelerate the reaction it is generally advantageous to use an agent capable of binding acid, for example, anhydrous sodium acetate or pyridine. Some of the pigments obtained are crystalline and some are amorphous and most of them are obtained in a very good yield and in a pure state. It is advantageous to isolate the acid chlorides which have been obtained from the carboxylic acids but in some cases, however, isolation of the acid chlorides can be omitted without harm and condensation carried out immediately following the formation of the carboxylic acid chlorides.

The new products are valuable pigments which can be used for a very wide variety of purposes. For example, they can be used in a state of fine division for the spin-colouration of filament and staple fibre viscose rayon, cellulose ethers and esters, polyamides, polyurethanes and polyesters, as well as in the preparation of coloured lacquers and like formers, solutions and products made from cellulose acetate, nitrocellulose, natural resins and synthetic resins, for example, polymerization resins and condensation resins, for example, aminoplasts, alkyd resins, phenoplasts, polyolefines, for example, polystyrene, polyvinyl chloride, polyethylene, polypropylene, polyacrylonitrile and from rubber, casein, silicones and silicone resins. They can also be used with advantage in the preparation of coloured pencil and laminated sheet material.

The following examples illustrate the invention.

*Example 1*

7.03 parts of 3'-hydroxyquinophthalone-5-carboxylic acid chloride of the formula

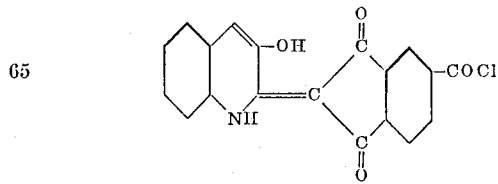

(prepared in accordance with United States patent specification No. 3,023,214 granted to E. I. du Pont de Nemours and Company, Wilmington, Del., a corporation of Delaware, on Feb. 27, 1962, Example 7, by heating trimellitic acid anhydride with 2-methyl-3-hydroxyquinoline-4-carboxylic acid in orthodichlorobenzene and converting the carboxylic acid into the acid chloride by means of thionyl chloride) were heated to 100 to 110° C. in 250 parts of anhydrous ortho-dichlorobenzene and 0.05 part of thionyl chloride. A solution of 1.08 parts of 1:4-diaminobenzene in about 50 parts of anhydrous orthodichlorobenzene at 100 to 110° C. and 0.1 part of anhydrous pyridine were added and the whole heated for 5 to 6 hours at 140 to 160° C. The reaction mixture was allowed to cool to 100° C., filtered, and the filter residue washed with ortho-dichlorobenzene having a temperature of 100 to 120° C. until the washings ran almost colourless, with methanol and water and the pigment so obtained dried in vacuo at 90 to 100° C. A yellow-orange powder was obtained. When this powder was converted into a state of fine division and worked into polyvinyl chloride on a roller mill it produced a yellow film having a good fastness to migration and to light.

In column II of the following table are listed the tints of polyvinyl chloride films coloured with the pigments obtainable by condensing the acid chloride used in Example 1 with the diamines listed in column I.

| | Column I | Column II |
|---|---|---|
| 1 | 4:4'-diaminophenyl | Yellow. |
| 2 | 3:3'-dimethoxy-4:4'-diaminodiphenyl | Yellow-orange. |
| 3 | 4:4'-diaminodiphenylsulphone | Yellow. |
| 4 | 2:5-dichloro-1:4-diaminobenzene | Do. |
| 5 | 3:3'-dichloro-4:4'-diaminodiphenyl | Do. |
| 6 | 1:5-diaminonaphthalene | Do. |
| 7 | 1:2-diaminobenzene | Do. |
| 8 | 2:5-dimethoxy-1:4-diaminobenzene | Yellow-orange. |
| 9 | 3:8-diaminopyrene | Yellow. |
| 10 | 4-(4'-aminobenzoylamino)-1-aminobenzene | Do. |
| 11 | 3:3'-diaminodiphenylsulphone | Reddish yellow. |
| 12 | 4:4'-diaminodiphenylformylamine | Yellowish brown. |
| 13 | 2-methyl-5-chloro-1:4-diaminobenzene | Greenish yellow. |
| 14 | 2:5-diethoxy-1:4-diaminobenzene | Orange. |
| 15 | 2:5-dimethyl-1:4-diaminobenzene | Greenish yellow. |
| 16 | 4-aminobenzoic acid-4'-aminophenylester | Yellow. |
| 17 | 3:3'-dimethyl-4:4'-diaminodiphenyl | Do. |
| 18 | 1:2-diamino-4-nitrobenzene | Do. |
| 19 | 1:3-diamino-4-methylbenzene | Do. |
| 20 | 1:3-diamino-4:6-dimethylbenzene | Do. |
| 21 | 1:3-diamino-4:5:6-trichlorobenzene | Do. |
| 22 | 1:3-diamino-5-carbomethoxybenzene | Do. |
| 23 | 1:3-diamino-5-carbanilidobenzene | Reddish yellow. |
| 24 | 3:3'-dimethyl-4:4'-diaminodiphenyl | Yellow. |
| 25 | 4:4'-diaminodiphenylether | Do. |
| 26 | 3:3'-diaminodiphenylmethane | Do. |
| 27 | 4:4'-diaminodiphenylmethane | Do. |
| 28 | 3:3'-diamino-4:4'-dimethyldiphenylmethane | Do. |
| 29 | 3:3'-diamino-4:4'-dichlorobenzil | Do. |
| 30 | 4:4'-diamino-2:5:2':5'-tetrachlorodiphenylurea | Do. |
| 31 | Di-(4-aminobenzenesulphonyl)-methylimide | Do. |
| 32 | 3:10-diaminopyrene | Do. |
| 33 | 1:4-diaminoanthraquinone | Brown. |
| 34 | 1:5-diaminoanthraquinone | Yellow-brown. |
| 35 | 2:6-diaminoanthraquinone | Yellow. |
| 36 | 2:6-diaminopyridine | Do. |
| 37 | 3:5-diamino-1-methyl-2:4:6-triazine | Do. |
| 8 | 3:3'-diaminodibenzofuran | Do. |
| 39 | Ethylenediamine | Do. |
| 30 | Hydrazine | Do. |

*Example 2*

5.1 parts of 3'-hydroxy-6':8'-dibromoquinophthalone-5-carboxylic acid chloride of the formula

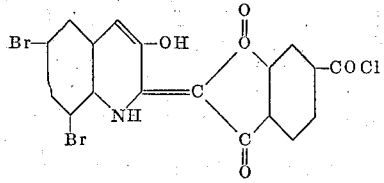

(prepared by heating 2-methyl-3-hydroxy-6:8-dibromoquinoline-4-carboxylic acid with trimellitic acid anhydride in ortho-dichlorobenzene and converting the carboxylic acid into the acid chloride by means of thionyl chloride) were heated to 100 to 110° C. in 120 parts of nitrobenzene and 0.02 part of thionyl chloride. A solution of 0.92 part of 4:4'- diaminodiphenyl in about 50 parts of nitrobenzene at 100 to 120° C. and 0.8 part of pyridine were added and the whole heated for 5 to 6 hours at 140 to 160° C. while stirring well. The reaction mixture was cooled to about 120° C., filtered and the filter residue well washed with hot nitrobenzene. It was then washed successively with methanol and water and the pigment so obtained dried in vacuo at 80 to 100° C. When this powder was converted into a state of fine division and worked into polyvinyl chloride on a roller mill it produced a yellow film having a good fastness to migration and to light.

In column II of the following table are listed the tints of polyvinyl chloride films coloured with pigments obtainable by condensing the acid chloride used in Example 2 with the diamines listed in column I.

| | I | II |
|---|---|---|
| 1 | 1:4-diaminobenzene | Reddish yellow. |
| 2 | 4:4'-diaminodiphenyl | Yellow. |
| 3 | 3:3'-dimethoxy-4:4'-diaminodiphenyl | Do. |
| 4 | 3:3'-dichloro-4:4'-diaminodiphenyl | Do. |
| 5 | 2-methoxy-5-chloro-1:4-diaminobenzene | Do. |
| 6 | 2:5-dimethoxy-1:4-diaminobenzene | Yellowish brown. |
| 7 | 1:3-dimethyl-4:6-diaminobenzene | Yellow. |
| 8 | Hydrazine | Do. |

*Example 3*

The 3'-hydroxy-6':8'-dibromoquinophthalone-5-carboxylic acid chloride used in Example 2 was replaced by an equivalent proportion of 3'-hydroxy-6:6':8'-dichloroquinophthalone-5-carboxylic acid chloride and the same procedure adopted as in that example. The yellow powder so obtained was converted into a state of fine division and worked into polyvinyl chloride on a roller mill. A yellow film having a good fastness to migration and to light was obtained.

*Example 4*

3.86 parts of 3'-hydroxy-6'-chloroquinophthalone-5-carboxylic acid chloride of the formula

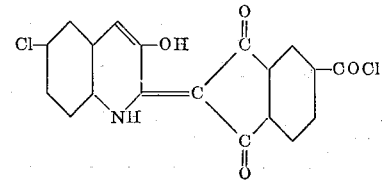

(prepared by heating 6-chloro-2-methyl-3-hydroxyquinoline-4-carboxylic acid with trimellitic acid anhydride in orthodichlorobenzene and converting the carboxylic acid into the acid chloride by means of thionyl chloride) were heated at 100 to 110° C. in 120 parts of nitrobenzene and 0.02 part of thionyl chloride. A solution of 0.54 part of 1:4-diaminobenzene and 0.8 part of pyridine in about 50 parts of nitrobenzene was added and the whole heated at 140 to 160° C. for 5 to 6 hours. The reaction mixture was cooled to about 120° C., filtered and the pigment washed successively with hot nitrobenzene, cold methanol and water and then dried in vacuo at about 100° C. A yellow powder was obtained. When this powder was converted into a state of fine division and worked into polyvinyl chloride on a roller mill it produced a yellow film having a good fastness to migration and to light.

In column II of the following table are listed the tints of polyvinyl chloride films coloured with the pigments obtainable by condensing the acid chloride used in Example 4 with the diamines listed in column I.

| | I | II |
|---|---|---|
| 1 | 1:3-dimethyl-4:6-diaminobenzene | Yellow. |
| 2 | 2:5-dichloro-1:4-diaminobenzene | Yellow-orange. |
| 3 | 3:3'-dichloro-4:4'-diaminodiphenyl | Yellow. |
| 4 | 3:3'-dimethoxy-4:4'-diaminodiphenyl | Reddish yellow. |

*Example 5*

The 3.86 parts of 3'-hydroxy-6'-chloroquinophthalone-5-carboxylic acid chloride used in Example 4 were replaced by 4.305 parts of 3'-hydroxy-6'-bromoquinophthalone-5-carboxylic acid and the same procedure adopted as in that example. The yellow powder so obtained was converted into a state of fine division and worked into polyvinyl chloride on a roller mill. A yellow film having a good fastness to migration and to light was obtained.

In column II of the following table are listed the tints produced with the pigments obtainable by condensing 3'-hydroxy - 6' - bromoquinophthalone-5-carboxylic acid chloride with the diamines listed in column I.

| | I | II |
|---|---|---|
| 1 | 4:4'-diaminodiphenyl | Yellow. |
| 2 | 3:3'-dichloro-4:4'-diaminodiphenyl | Do. |
| 3 | 3:3'-dimethyl-4:4'-diaminodiphenyl | Do. |
| 4 | 3:3'-dimethoxy-4:4'-diaminodiphenyl | Yellow-orange. |
| 5 | 2:5-dichloro-1:4-diaminobenzene | Reddish yellow. |
| 6 | 2:5-dimethyl-1:4-diaminobenzene | Yellow. |
| 7 | 1:3-dimethyl-4:6-diaminobenzene | Do. |
| 8 | 1:5-diaminonaphthalene | Do. |

Example 6

4.0 parts of 3'-hydroxy-6'-chloro-8'-methylquinophthalone-5-carboxylic acid chloride of the formula

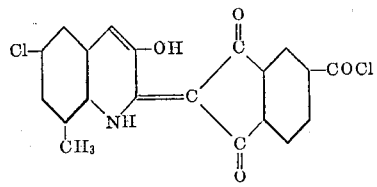

(prepared by heating 6-chloro-2:8-dimethyl-3-hydroxyquinoline-4-carboxylic acid with trimellitic acid anhydride in ortho-dichlorobenzene and converting the carboxylic acid into the acid chloride by means of thionyl chloride) were condensed with 0.54 part of 1:4-diaminobenzene in the manner described in Examples 2 and 4. A yellow powder was obtained. When this powder was converted into a state of fine division and worked into polyvinyl chloride on a roller mill it produced a yellow film having a good fastness to migration and to light.

In column II of the following table are listed the tints of polyvinyl chloride films coloured with the pigments obtainable by condensing the acid chloride used in Example 6 with the diamines listed in column I.

| | I | II |
|---|---|---|
| 1 | 2:5-dichloro-1:4-diaminobenzene | Yellow. |
| 2 | 2:5-dimethyl-1:4-diaminobenzene | Do. |
| 3 | 2:5-dimethoxy-1:4-diaminobenzene | Do. |
| 4 | 2-methoxy-5-chloro-1:4-diaminobenzene | Do. |
| 5 | 1:3-dimethyl-4:6-diaminobenzene | Do. |
| 6 | 4:4'-diaminodiphenyl | Do. |
| 7 | 3:3'-dichloro-4:4'-diaminodiphenyl | Do. |
| 8 | 3:3'-dimethoxy-4:4'-diaminodiphenyl | Yellow-orange. |

Example 7

3.7 parts of 3'-hydroxy-6':8'-dimethylquinophthalone-5-carboxylic acid chloride of the formula

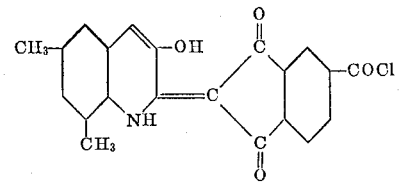

(prepared by heating 2:6:8-trimethyl-3-hydroxyquinoline-4-carboxylic acid with trimellitic acid anhydride in ortho-dichlorobenzene and converting the carboxylic acid into the acid chloride by means of thionyl chloride) were condensed with 1.22 parts of 3:3'-dimethoxy-4:4'-diaminodiphenyl in the manner described in Examples 2 and 4. An orange powder was obtained. When this powder was converted into a state of fine division and worked into polyvinyl chloride on a roller mill it produced a reddish yellow film having a good fastness to migration and to light.

When the 1.22 parts of 3:3'-dimethoxy-4:4'-diaminodiphenyl used in Example 7 were replaced by 1.275 parts of 3:3'-dichloro-4:4'-diaminodiphenyl or by 0.99 part of 3:3'-diaminodibenzofuran, the pigments obtained produced a reddish yellow tint and a yellow tint respectively when worked into polyvinyl chloride film.

Example 8

4.02 parts of 3'-hydroxy-7':8'-benzoquinophthalone-5-carboxylic acid chloride of the formula

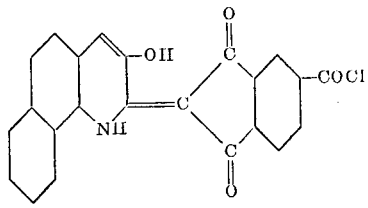

(prepared by heating 2-methyl-3-hydroxy-7:8-benzoquinoline-4-carboxylic acid with trimellitic acid anhydride in orthodichlorobenzene and converting the carboxylic acid into the acid chloride by means of thionyl chloride) were condensed with 0.92 part of 4:4'-diaminodiphenyl in a manner analogous to that described in Examples 2 and 4. An orange powder was obtained. When this powder was converted into a state of fine division and worked into polyvinyl chloride on a roller mill it produced a yellow film having a good fastness to migration and to light.

Further pigments were obtained by condensing the acid chloride used in Example 8 with the diamines listed in column I of the following table. The tints of polyvinyl chloride films coloured with these pigments are indicated in column II.

| | I | II |
|---|---|---|
| 1 | 3:3'-dichloro-4:4'-diaminodiphenyl | Yellow. |
| 2 | 3:3'-dimethoxy-4:4'-diaminodiphenyl | Orange. |
| 3 | 1:3-dimethyl-4:6-diaminobenzene | Yellow. |

Example 9

17.8 parts of 3'-hydroxyquinophthalone-4-carboxylic acid chloride of the formula

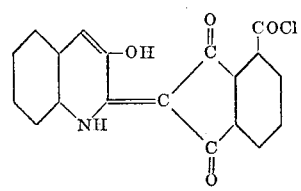

were stirred into 500 parts of anhydrous nitrobenzene and a hot solution of 4.42 parts of 2:5-dichloro-paraphenylenediamine in 250 parts of anhydrous nitrobenzene added. 1 part of absolute pyridine was then added and the batch heated to 140° C. in the course of 2 hours and stirred at that temperature for 17 hours. After coding the reaction mixture to 90° C. the dyestuff which precipitated in the form of crystals was isolated by suction filtration and washed with 100 parts of nitrobenzene at 100° C. The product was then suspended in 1,000 parts of ortho-dichlorobenzene, the suspension stirred for half an hour at 150° C., suction-filtered while hot, the filter residue washed successively with hot ortho-dichlorobenzene and hot ethanol and then dried in vacuo at 80° C. A yellow orange powder was obtained. When this powder was converted into a state of fine division and worked into polyvinyl chloride on a roller mill it produced a yellow film having an excellent fastness to migration and a high fastness to light.

In column II of the following table are listed the tints of polyvinyl chloride films coloured with the pigments obtainable by condensing in an analogous manner the above-mentioned acid chloride with the diamines listed in column I.

| | I | | I |
|---|---|---|---|
| 1 | 3:3'-dimethoxy-4:4'-diaminodiphenyl | | Yellow. |
| 2 | 3:3'-dichloro-4:4'-diaminodiphenyl | | Do. |

The acid chloride of the hitherto unknown 3'-hydroxyquinophthalone-4-carboxylic acid was prepared by a method analogous to that described in Example 7 of United States patent specification No. 3,023,214 by condensing hemimellitic anhydride with 2-methyl-3-hydroxyquinoline-4-carboxylic acid in ortho-dichlorobenzene and treating the carboxylic acid with thionyl chloride.

The 3'-hydroxyquinophthalone-4-carboxylic acid crystallized from dimethylformamide in the form of orange platelets melting at 318 to 319.5° C. Elementary analysis gave the following.

Calculated: C, 68.47%; H, 3.33%; N, 4.20%. Found: C, 67.9%, H, 3.7%; N, 4.5%.

Example 10

A mixture was prepared from 65 parts of polyvinyl chloride, 35 parts of dioctyl phthalate and 0.2 part of the pigment obtained in the manner described in the first paragraph of Example 1. This mixture was then worked to and fro for 7 minutes at 140° C. on a two-roller mill. A yellow film having a very good fastness to light and to migration was obtained.

Example 11

0.25 part of the pigment obtained in the manner described in the first paragraph of Example 1, 40 parts of an alkydmelamine stoving enamel containing 50% of solid substance and 4.75 parts of titanium dioxide were ground for 24 hours in a rod mill. A thin layer of the enamel so obtained was applied to aluminium foil and stoved for one hour at 120° C. A yellow coating having an excellent fastness to light was obtained.

Example 12

99 parts of ω-caprolactam polyamide in the form of chips were dry-coated with one part of the pigment obtained in the manner described in the first paragraph of Example 1, the pigment being in a state of very fine division. The coated chips were then spun in the usual manner, for example, by the grid-spinning process at about 260° C. The yellow filaments so obtained displayed an excellent fastness to light and to wet treatments.

What is claimed is:

1. A 3-hydroxyquinophthalone pigment of the formula

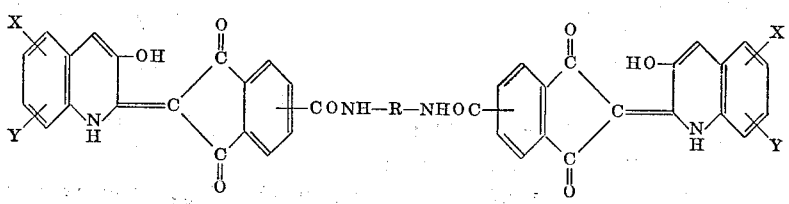

in which R is a benzene, diphenyl or naphthalene group, X and Y are hydrogen, chlorine, bromine or methyl or X and Y when in o-position to each other together with two adjacent carbon atoms are a benzene ring.

2. 3-hydroxyquinophthalone pigments as claimed in claim 1, wherein R is the group of the formula

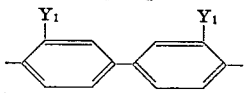

in which $Y_1$ is hydrogen, halogen, lower alkyl or lower alkoxy.

3. 3-hydroxyquinophthalone pigments as claimed in claim 1, wherein R is the group of the formula

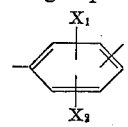

in which $X_1$ and $X_2$ are hydrogen, chlorine, bromine, lower alkyl, lower alkoxy, carbalkoxy, carbamido or nitro.

4. The pigment of the formula

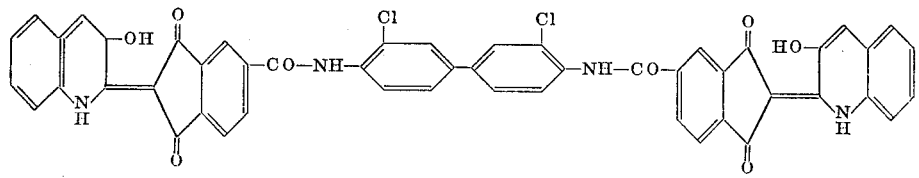

5. The pigment of the formula

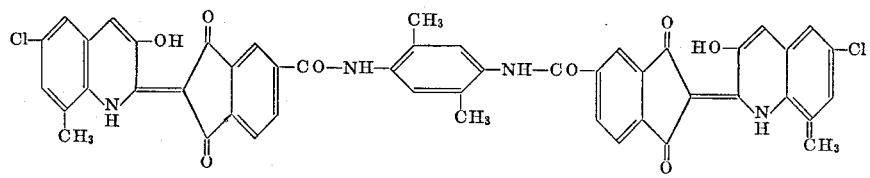

6. The pigment of the formula

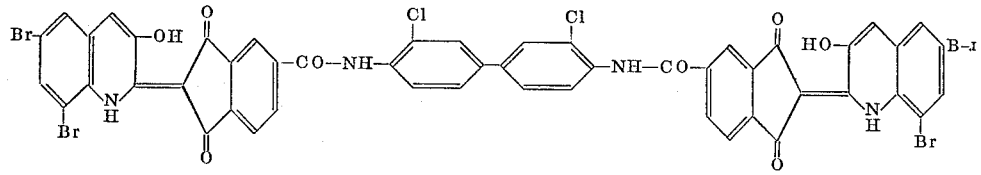

7. The pigment of the formula
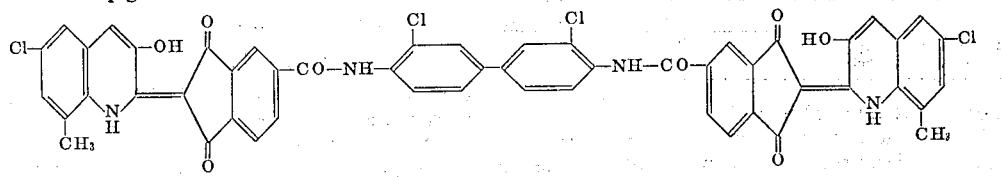
8. The pigment of the formula
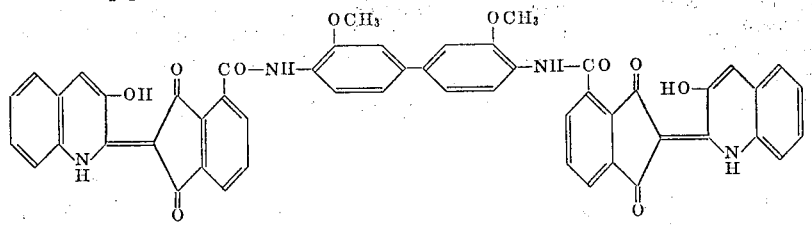
References Cited
UNITED STATES PATENTS
| | | | |
|---|---|---|---|
| 2,914,542 | 11/1959 | Randall et al. | 260—368 X |
| 2,985,656 | 5/1961 | Weber et al. | 260—329.2 X |
| 3,023,212 | 2/1962 | Richter | 260—287 |
| 3,023,213 | 2/1962 | Richter | 260—287 |
| 3,023,214 | 2/1962 | Richter | 260—287 |
ALEX MAZEL, *Primary Examiner.*
D. DAUS, *Assistant Examiner.*